United States Patent
Nordbruch

(10) Patent No.: US 10,429,837 B2
(45) Date of Patent: Oct. 1, 2019

(54) METHOD AND APPARATUS FOR OPERATING A MOTOR VEHICLE PARKED AT A FIRST POSITION

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 15/859,811

(22) Filed: Jan. 2, 2018

(65) Prior Publication Data

US 2018/0196420 A1    Jul. 12, 2018

(30) Foreign Application Priority Data

Jan. 9, 2017   (DE) .................. 10 2017 200 158

(51) Int. Cl.
| | |
|---|---|
| G05D 1/00 | (2006.01) |
| B62D 1/00 | (2006.01) |
| B62D 15/02 | (2006.01) |

(52) U.S. Cl.
CPC .......... G05D 1/0022 (2013.01); B62D 1/00 (2013.01); B62D 15/025 (2013.01); B62D 15/0285 (2013.01); G05D 1/0011 (2013.01); G05D 2201/0213 (2013.01)

(58) Field of Classification Search
CPC .................................................. G05D 1/0022
See application file for complete search history.

(56) References Cited

U.S. PATENT DOCUMENTS

| | | | |
|---|---|---|---|
| 9,783,231 B2 * | 10/2017 | Freistadt ............ | B62D 15/0285 |
| 2015/0346727 A1 | 12/2015 | Ramanujam | |
| 2016/0107691 A1 * | 4/2016 | Goldmann ......... | B62D 15/0285 |
| | | | 701/41 |
| 2016/0264132 A1 * | 9/2016 | Paul ....................... | B60W 30/06 |
| 2017/0032674 A1 * | 2/2017 | Baasch ................. | G05D 1/0276 |
| 2017/0132482 A1 * | 5/2017 | Kim ....................... | B60K 35/00 |
| 2017/0309184 A1 * | 10/2017 | Nordbruch ............... | G08G 1/04 |
| 2019/0054927 A1 * | 2/2019 | Hayakawa .......... | B62D 15/0285 |

FOREIGN PATENT DOCUMENTS

| | | |
|---|---|---|
| DE | 102009041587 A1 | 3/2011 |
| DE | 102012200725 A1 | 7/2013 |
| DE | 102014200611 A1 | 7/2015 |
| DE | 102014221745 A1 | 4/2016 |
| DE | 102014224079 A1 | 6/2016 |

\* cited by examiner

*Primary Examiner* — Alex C Dunn
(74) *Attorney, Agent, or Firm* — Norton Rose Fulbright US LLP; Gerard Messina

(57) ABSTRACT

A method for operating a motor vehicle parked at a first position, using a mobile terminal, including monitoring a surrounding field of the parked motor vehicle and/or a route from a present position of the mobile terminal to the parked motor vehicle, transmission of monitoring data, based on the monitoring, via a wireless communication network to a mobile terminal, after the transmission of the monitoring data, reception of a move command, sent from the mobile terminal via the wireless communication network, for moving the motor vehicle away from the first position, transferring the motor vehicle from the first position to a second position in response to the reception of the move command transmitted from the mobile terminal via the wireless communication network. A corresponding apparatus and a computer program are also described.

20 Claims, 1 Drawing Sheet

METHOD AND APPARATUS FOR OPERATING A MOTOR VEHICLE PARKED AT A FIRST POSITION

CROSS REFERENCE

The present application claims the benefit under 35 U.S.C. § 119 of German Patent Application No. DE 102017200158.5 filed on Jan. 9, 2017, which is expressly incorporated herein by reference in its entirety.

FIELD

The present invention relates to a method and an apparatus for operating a motor vehicle parked at a first position. In addition, the present invention relates to a computer program.

BACKGROUND INFORMATION

For safety reasons, persons who are moving toward a parked motor vehicle in order to get in and drive away with it have an interest in obtaining information as to the extent to which the area surrounding the motor vehicle is safe. In particular, such persons usually want to know whether a stranger has broken into the motor vehicle during their absence from the vehicle.

Furthermore, already at a distance from the parked motor vehicle, thus, especially when there is no visual contact with the motor vehicle, there is a need to discover whether someone is trying illegally to gain access to the parked motor vehicle, thus, particularly to get into the parked vehicle.

German Patent Application No. DE 10 2014 224 079 A1 describes a method and an apparatus for monitoring a vehicle located within a parking facility.

German Patent Application No. DE 10 2014 221 745 A1 describes a method and a system for monitoring a vehicle in a parking facility.

German Patent Application No. DE 10 2012 200 725 A1 describes remote control of the maneuvering and parking of motor vehicles.

SUMMARY

An object of the present invention includes providing for the efficient operation of a parked motor vehicle, which is able to efficiently supply a person with information about a surrounding field of the parked motor vehicle and/or about an interior of the parked motor vehicle.

This objective may be achieved in accordance with the present invention. Advantageous developments of the present invention are described herein.

According to one aspect, a method is provided for operating a motor vehicle parked at a first position, using a mobile terminal, including the following steps:
Monitoring a surrounding field of the parked motor vehicle and/or a route from a present position of the mobile terminal to the parked motor vehicle;
Transmission of monitoring data, based on the monitoring, via a wireless communication network to a mobile terminal;
After the transmission of the monitoring data, reception of a move command, sent from the mobile terminal via the wireless communication network, for moving the motor vehicle away from the first position;
Transferring the motor vehicle from the first position to a second position in response to the reception of the move command sent from the mobile terminal via the wireless communication network.

According to a further aspect, an apparatus is provided for operating a motor vehicle parked at a first position, the apparatus being designed to carry out the method for operating a motor vehicle parked at a first position.

According to another aspect, a computer program is provided which includes program code for carrying out the method for operating a motor vehicle parked at a first position, when the computer program is executed on a computer.

In accordance with the present invention, the objective above may be achieved by transmitting monitoring data, based on the monitoring, to the mobile terminal. Thus, the mobile terminal is able to render the monitoring data in a form understandable for a person who is carrying the mobile terminal with him, so that the person is accordingly able to monitor the area surrounding the motor vehicle and the motor vehicle interior, respectively, from a distance.

The person who is carrying the mobile terminal with him is therefore able to decide whether or not it is necessary that the motor vehicle move away from its present position, thus, the first position. If the person decides that the motor vehicle must move away, then using the mobile terminal, he sends a corresponding move command via the wireless communication network for the motor vehicle to move away.

In response to the reception of the move command, it is then provided that the motor vehicle is transferred from the first position to a second position.

For example, the technical advantage is thus attained that the motor vehicle is able to be moved to a distance from a potential source of danger in the area surrounding the first position. For instance, safety is thereby increased for the person who wants to go to the motor vehicle.

Thus, in accordance with the present invention, if, during the monitoring, it is determined, from the viewpoint of the person who is carrying the mobile terminal with him, that the distance, i.e., therefore the route from the present position of the mobile terminal to the parked motor vehicle and/or the surrounding field of the motor vehicle is unsafe, i.e., is not safe for the person, then from a distance, the person is able to have the motor vehicle transferred from the current position, thus the first position, to a different, usually safer, position, here, the second position.

According to one specific embodiment, the surrounding field of the motor vehicle and/or the route is/are monitored and the corresponding monitoring data is transmitted during the transfer, as well.

For example, this yields the technical advantage that the person who is carrying the mobile terminal with him is able to monitor the corresponding surroundings and the route, respectively, even during the transfer.

According to one specific embodiment, the transfer includes operating the motor vehicle by remote control and/or an at least autonomous driving of the motor vehicle and/or manual driving of the motor vehicle.

For example, this provides the technical advantage that the transfer may be carried out efficiently.

For instance, the remote control of the motor vehicle includes operating the motor vehicle by remote control using the mobile terminal. In other words, for example, one or more remote-control commands are thus sent from the mobile terminal via the wireless communication network to the motor vehicle. In response to reception of these remote-control commands, the motor vehicle is then operated by remote control accordingly.

For example, the remote control of the motor vehicle includes operation of the motor vehicle by remote control using a remote-control device which is assigned to an infrastructure. Thus, this remote-control device is not the mobile terminal. For instance, the remote-control device transmits one or more remote-control commands to the motor vehicle in order to operate it by remote control.

For example, the remote-control device receives the move command and operates the motor vehicle by remote control in response to the reception of the move command.

The autonomous driving of the motor vehicle means, specifically, that the motor vehicle drives automatically, thus, is not operated by remote control.

Manual driving of the motor vehicle means that a person guides the motor vehicle manually, thus, is in the motor vehicle itself in order to guide it.

In another specific embodiment, the remote-control device automatically operates the motor vehicle by remote control.

In a further specific embodiment, the remote-control device is operated manually by a person, e.g., by service personnel of an infrastructure, in order to control the motor vehicle remotely.

In particular, the transfer of the motor vehicle includes transfer without a driver.

In one specific embodiment, the method includes reception, via the wireless communication network, of a driving route from the first position to the second position, sent from the mobile terminal via the wireless communication network, so that the driving route is specified by way of the mobile terminal, with the result that the motor vehicle is guided along the driving route from the first position to the second position.

For example, this provides the technical advantage that the motor vehicle may be transferred efficiently. Here, for example, the person who is carrying the mobile terminal with him thus predetermines the driving route, using the mobile terminal.

According to one specific embodiment, the method includes reception of position data corresponding to the second position and transmitted from the mobile terminal via the wireless communication network, so that the second position is specified by way of the mobile terminal.

For example, this provides the technical advantage that the motor vehicle may be transferred efficiently.

In another specific embodiment, the method includes computerized ascertainment of the second position, only one position for which one or more predetermined conditions are satisfied being ascertained with computer assistance as the second position.

For example, this provides the technical advantage that the second position may be determined efficiently. Because one or more predetermined conditions must be satisfied for such a position ascertained with the aid of a computer, advantageously, it is possible to ensure efficiently that the position meets certain minimum requirements.

Computerized ascertainment means, in particular, that the ascertainment is accomplished by a computer.

In one specific embodiment, the one or more predetermined conditions include that the one position is illuminated with a predetermined brightness and/or that traffic in an area surrounding the second position exhibits a predetermined minimum density and/or that the one position is located on a roadway and/or, if the first position is within a parking facility, that the one position is located at an exit of the parking facility.

For example, the technical advantage is thereby obtained that the second position is adequately illuminated and/or that there are sufficient further road users in the area surrounding the second position, which usually increases a sense of security for the person going to the motor vehicle, and/or, if the motor vehicle is located on the roadway, that it is ready to drive off immediately, and/or that the person who is carrying the mobile terminal with him is able to take over the motor vehicle immediately at the exit of the parking facility.

The position on the roadway corresponds especially to a stopping in the second lane.

In one specific embodiment, the second position is set apart a predetermined minimum distance, e.g., at least 50 m, from the first position.

For example, this yields the technical advantage that a sufficient distance to the original position, thus, to the first position, is able to be ensured, which therefore likewise ensures a sufficient distance to a potential source of danger in the area surrounding the first position.

According to one specific embodiment, the method for operating a motor vehicle parked at a first position is implemented or carried out with the aid of the apparatus for operating a motor vehicle parked at a first position.

Technical functionalities of the method are obtained analogously from corresponding technical functionalities of the apparatus and vice versa.

That means, in particular, that method features are thus derived from corresponding apparatus features and vice versa.

According to one specific embodiment, monitoring within the meaning of the specification is carried out with the aid of one or more sensors.

Sensors within the meaning of the specification include, in particular, sensors on-board the motor vehicle and/or sensors off-board the motor vehicle On-board sensors denote sensors which are assigned to the parked motor vehicle.

Off-board sensors denote sensors which do not belong to the parked motor vehicle, which thus belong to an infrastructure, for example. Off-board sensors thus denote sensors which are assigned to an infrastructure.

For instance, the parked motor vehicle is thus parked within an infrastructure.

An infrastructure for the purpose of the specification is, e.g., a parking facility. For instance, a parking facility is a parking block or a parking garage.

In one specific embodiment, the sensor or sensors in each case is/are an element selected from the following group of sensors: video sensor, especially video sensor of a video camera, radar sensor, ultrasonic sensor, lidar sensor, infrared sensor, magnetic sensor, photoelectric-barrier sensor, laser sensor.

An infrastructure for the purpose of the specification includes especially one or more infrastructure elements. For example, sensors are disposed on the one or more infrastructure elements. An infrastructure element within the meaning of the specification is, e.g., one of the following infrastructure elements: ceiling, floor, column, wall, door frame, post, especially lamp post, pole, especially lamp pole, traffic light, building, roof.

In one specific embodiment, the mobile terminal is a cell phone.

In one specific embodiment, the mobile terminal is a watch, especially a Smartwatch.

According to one specific embodiment, the wireless communication network includes a cellular communication network and/or a WLAN communication network and/or a Bluetooth communication network.

For example, a cellular communication network includes a GSM communication network and/or an LTE communication network.

In particular, the mobile terminal is carried along by a person.

For instance, this person who is carrying the mobile terminal with him is a future driver of the motor vehicle or a future passenger of the motor vehicle.

According to one specific embodiment, the person who is carrying the mobile terminal with him is moving toward the parked motor vehicle.

In particular, the formulation "respectively" includes the formulation "and/or."

A surrounding field of the motor vehicle denotes, specifically, an area around the motor vehicle up to a maximum distance of, e.g., 50 m, especially 25 m, e.g., 15 m, especially 10 m, e.g., 5 m, especially 3 m.

According to one specific embodiment, the apparatus includes a communication interface for transmitting monitoring data via a wireless communication network to a mobile terminal, the monitoring data being based upon monitoring of the surrounding field of the motor vehicle and/or the route.

In one specific embodiment, the communication interface is designed to receive a move command, sent from the mobile terminal via the wireless communication network, for moving the motor vehicle away from the first position.

In one specific embodiment, the apparatus includes a remote-control device which is designed, in response to the reception of the move command sent from the mobile terminal via the wireless communication network, to transfer the motor vehicle from the first position to a second position.

According to one specific embodiment, the apparatus includes one or more sensors.

The present invention is explained in greater detail below on the basis of preferred exemplary embodiments.

DETAILED DESCRIPTION OF EXAMPLE EMBODIMENTS

Figure 1:
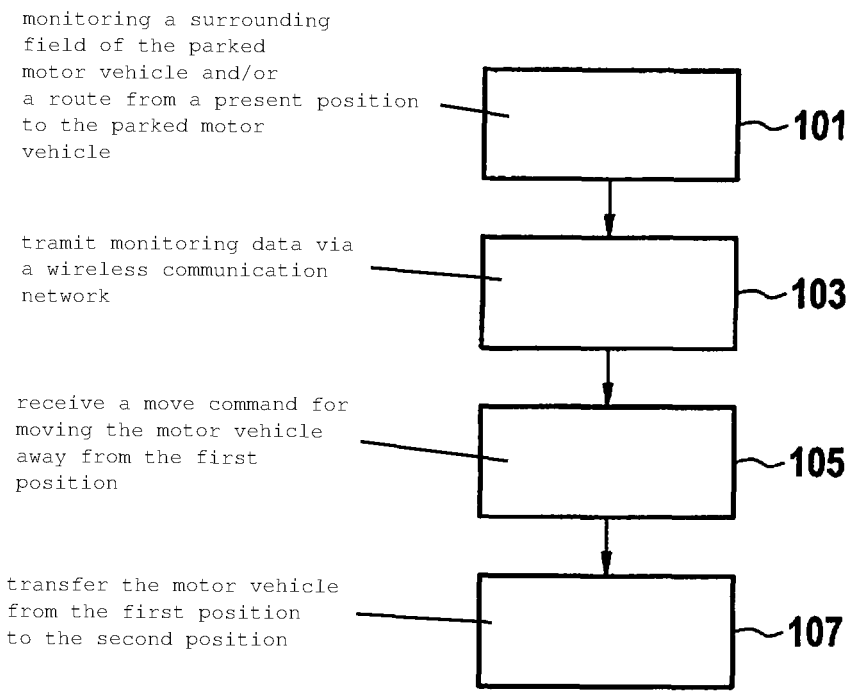
FIG. 1 shows a flowchart of a method for operating a motor vehicle parked at a first position.

FIG. 1 shows a flowchart of a method for operating a motor vehicle parked at a first position, using a mobile terminal.

The method includes the following steps:

Monitoring 101 a surrounding field of the parked motor vehicle and/or a route from a present position of the mobile terminal to the parked motor vehicle;

Transmission 103 of monitoring data, based on the monitoring, via a wireless communication network to a mobile terminal;

After transmission 103 of the monitoring data, reception 105 of a move command, sent from the mobile terminal via the wireless communication network, for moving the motor vehicle away from the first position;

Transferring 107 the motor vehicle from the first position to a second position in response to reception 105 of the move command transmitted from the mobile terminal via the wireless communication network.

Figure 2:
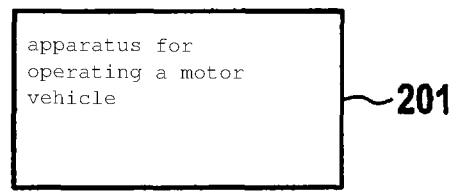
FIG. 2 shows an apparatus for operating a motor vehicle parked at a first position.

FIG. 2 shows an apparatus 201 for operating a motor vehicle parked at a first position. Apparatus 201 is designed to implement or carry out the method for operating a motor vehicle parked at a first position.

In summary, the present invention provides for monitoring a surrounding field of a parked motor vehicle and/or a route from a present position of the mobile terminal to the parked motor vehicle. The monitoring is accomplished, e.g., with the aid of one or more sensors. For instance, these sensors are sensors on-board the motor vehicle and/or sensors off-board the motor vehicle.

The monitoring data corresponding to this monitoring is transmitted via a wireless communication network to the mobile terminal. The person who is carrying the mobile terminal with him is thus likewise able to monitor the surrounding field of the motor vehicle and/or the route from a distance. Consequently, the person is thus advantageously enabled to decide by himself whether it is necessary for the parked motor vehicle to move away from the first position.

For example, such moving away may result from the fact that a suspicious person is in the surrounding field of the motor vehicle or on the route. That is, from the perspective of the person, the route or the surrounding field of the motor vehicle thus is no longer safe.

Consequently, it is then provided that, using his mobile terminal, the person sends out a move command via the wireless communication network, to the effect that the motor vehicle is to move away. In response to the reception of the move command, the motor vehicle is then transferred from the first position to a second position. Thus, the motor vehicle is driven away from the first position.

For example, the motor vehicle is driven or transferred to a position which is illuminated more brightly relative to the first position.

The transfer of the motor vehicle includes operating the motor vehicle by remote control, for example.

According to one specific embodiment, the transfer of the motor vehicle thus means that the motor vehicle is transferred or driven without a driver from the first position to the second position.

For example, the motor vehicle is operated by remote control directly by the person using the mobile terminal.

In one specific embodiment, the second position is predetermined, e.g., by the person who is carrying the mobile terminal with him, the motor vehicle driving autonomously to the second position, for example.

In one specific embodiment, a route from the first position to the second position is specified, e.g., by the person who is carrying the mobile terminal with him, the motor vehicle driving autonomously, for example, along the route from the first position to the second position.

If the motor vehicle drives autonomously, thus, automatically, it is provided, for example, that the person who is carrying the mobile terminal with him is able to intervene in the autonomous drive, using the mobile terminal.

In one specific embodiment, the motor vehicle is operated by remote control using a remote-control device which is different from the mobile terminal and, in particular, is thus assigned to an infrastructure, in order to transfer the motor vehicle from the first position to the second position.

For example, the provision of such a remote-control device has the technical advantage that generally, it possesses more computing power than the mobile terminal. As a result, for instance, the remote control may be accomplished efficiently.

According to one specific embodiment, the remote-control device operates the motor vehicle by remote control automatically, thus, without assistance of human personnel.

In one specific embodiment, service personnel, thus, a human person, operates the motor vehicle by remote control, using the remote-control device.

According to one specific embodiment, an authorization is received from the driver before the service person operates the motor vehicle by remote control, using the remote-control device.

According to one specific embodiment, the person who is carrying the mobile terminal with him asks service personnel, e.g., local service personnel, for assistance. For instance, such assistance includes driving the motor vehicle away manually. Service personnel includes security personnel, for example.

What is claimed is:

1. A method for operating a motor vehicle parked at a first position, using a mobile terminal, comprising:
   monitoring, using at least one sensor, at least one of a surrounding field of the parked motor vehicle and a route from a present position of the mobile terminal to the parked motor vehicle;
   transmitting monitoring data, based on the monitoring, via a wireless communication network to the mobile terminal;
   computerized ascertaining of a second position, the second position being ascertained using a computer based on the second position satisfying one or more predetermined conditions;
   after transmitting the monitoring data, receiving a move command, sent from the mobile terminal via the wireless communication network, for moving the motor vehicle away from the first position; and
   operating the motor vehicle in a driverless manner to move the motor vehicle from the first position to the ascertained second position in response to the reception of the move command sent from the mobile terminal via the wireless communication network;
   wherein the one or more predetermined conditions include at least one of the following: (i) that the second position is illuminated with a predetermined brightness, and/or (ii) that traffic in an area surrounding the second position exhibits a predetermined minimum density, and/or (iii) that the second position is located on a roadway, and/or (iv) that the second position is located at an exit of a parking facility.

2. The method as recited in claim 1, wherein at least one of the surrounding field of the motor vehicle and the route is monitored and the corresponding monitoring data is transmitted during the transfer.

3. The method as recited in claim 1, wherein the transfer operating of the motor vehicle includes operating the motor vehicle by remote control, or by autonomous driving of the motor vehicle.

4. The method as recited in claim 1, further comprising:
   receiving, via the wireless communication network, a driving route from the first position to the ascertained second position, sent from the mobile terminal via the wireless communication network, so that the driving route is specified by way of the mobile terminal, with the result that the motor vehicle is guided along the driving route from the first position to the ascertained second position.

5. The method as recited in claim 1, further comprising:
   receiving position data corresponding to the ascertained second position and transmitted from the mobile terminal via the wireless communication network, so that the ascertained second position is specified by way of the mobile terminal.

6. The method as recited in claim 1, wherein the ascertained second position is set apart a predetermined minimum distance at least 50 m from the first position.

7. An apparatus for operating a motor vehicle parked at a first position, using a mobile terminal, the apparatus designed to:
   monitor, using at least one sensor, at least one of a surrounding field of the parked motor vehicle and a route from a present position of the mobile terminal to the parked motor vehicle;
   transmit monitoring data, based on the monitoring, via a wireless communication network to the mobile terminal;
   computerized ascertainment of a second position, the second position being ascertained using a computer based on the second position satisfying one or more predetermined conditions;
   after transmitting the monitoring data, receive a move command, sent from the mobile terminal via the wireless communication network, for moving the motor vehicle away from the first position; and
   operate the motor vehicle is a driverless manner to move the motor vehicle from the first position to the ascertained second position in response to the reception of the move command sent from the mobile terminal via the wireless communication network;
   wherein the one or more predetermined conditions include at least one of the following: (i) that the second position is illuminated with a predetermined brightness, and/or (ii) that traffic in an area surrounding the second position exhibits a predetermined minimum density, and/or (iii) that the second position is located on a roadway, and/or (iv) that the second position is located at an exit of a parking facility.

8. A non-transitory computer-readable storage medium on which is stored a computer program including program code for operating a motor vehicle parked at a first position, using a mobile terminal, the computer program, when executed by a computer, causing the computer to perform:
   monitoring, using at least one sensor, at least one of a surrounding field of the parked motor vehicle and a route from a present position of the mobile terminal to the parked motor vehicle;
   transmitting monitoring data, based on the monitoring, via a wireless communication network to the mobile terminal;
   computerized ascertaining of a second position, the second position being ascertained using a computer based on the second position satisfying one or more predetermined conditions;
   after transmitting the monitoring data, receiving a move command, sent from the mobile terminal via the wireless communication network, for moving the motor vehicle away from the first position; and
   operating the motor vehicle in a driverless manner to move the motor vehicle from the first position to the ascertained second position in response to the reception of the move command sent from the mobile terminal via the wireless communication network;
   wherein the one or more predetermined conditions include at least one of the following: (i) that the second position is illuminated with a predetermined brightness, and/or (ii) that traffic in an area surrounding the second position exhibits a predetermined minimum density, and/or (iii) that the second position is located on a roadway, and/or (iv) that the second position is located at an exit of a parking facility.

9. The method as recited in claim 1, wherein the one or more predetermined conditions includes that the second position is illuminated with the predetermined brightness.

10. The method as recited in claim 1, wherein the one or more predetermined conditions includes that the traffic in the area surrounding the second position exhibits the predetermined minimum density.

11. The method as recited in claim 1, wherein the one or more predetermined conditions includes that the second position is located on the roadway.

12. The method as recited in claim 1, wherein the one or more predetermined conditions includes that the second position is located at the exit of the parking facility.

13. The apparatus as recited in claim 7, wherein the one or more predetermined conditions includes that the second position is illuminated with the predetermined brightness.

14. The apparatus as recited in claim 7, wherein the one or more predetermined conditions includes that the traffic in the area surrounding the second position exhibits the predetermined minimum density.

15. The apparatus as recited in claim 7, wherein the one or more predetermined conditions includes that the second position is located on the roadway.

16. The apparatus as recited in claim 7, wherein the one or more predetermined conditions includes that the second position is located at the exit of the parking facility.

17. The non-transitory computer-readable storage medium as recited in claim 8, wherein the one or more predetermined conditions includes that the second position is illuminated with the predetermined brightness.

18. The non-transitory computer-readable storage medium as recited in claim 8, wherein the one or more predetermined conditions includes that the traffic in the area surrounding the second position exhibits the predetermined minimum density.

19. The non-transitory computer-readable storage medium as recited in claim 8, wherein the one or more predetermined conditions includes that the second position is located on the roadway.

20. The non-transitory computer-readable storage medium as recited in claim 8, wherein the one or more predetermined conditions includes that the second position is located at the exit of the parking facility.

* * * * *